US007878514B1

(12) United States Patent
Hopkins et al.

(10) Patent No.: US 7,878,514 B1
(45) Date of Patent: Feb. 1, 2011

(54) SELF LEVELING MOP BUCKET CART (75) Inventors: John Hopkins, Murray, KY (US);
Thomas Cunningham, Murray, KY (US)

(73) Assignee: Cunningham Hopkins, LLC, Murray, KY (US)

( * ) Notice: Subject to any disclaimer, the term of this patent is extended or adjusted under 35 U.S.C. 154(b) by 942 days.

(21) Appl. No.: 11/744,580

(22) Filed: May 4, 2007

(51) Int. Cl.
*B62B 3/08* (2006.01)
(52) U.S. Cl. .................................. 280/47.26; 280/79.5
(58) Field of Classification Search ............. 280/47.26, 280/47.34, 47.35, 79.11, 79.2, 79.3, 79.5; 248/129, 141, 142
See application file for complete search history.

(56) References Cited

U.S. PATENT DOCUMENTS

| 1,102,872 | A | * | 7/1914 | Cerney et al. ............... 414/457 |
| 1,479,223 | A | * | 1/1924 | Carroll .................... 280/47.18 |
| 2,579,639 | A | * | 12/1951 | Adams ........................ 280/30 |
| 4,534,576 | A | * | 8/1985 | Jones, Jr. ................. 280/47.26 |
| 4,767,128 | A | * | 8/1988 | Terhune ..................... 280/47.2 |
| 5,159,777 | A | * | 11/1992 | Gonzalez .................... 43/54.1 |
| 5,531,465 | A | * | 7/1996 | Aumasson ..................... 280/63 |

* cited by examiner

*Primary Examiner*—Frank B Vanaman
(74) *Attorney, Agent, or Firm*—Wyatt, Tarrant & Combs, LLP; Matthew A. Williams (57) ABSTRACT A mop bucket cart that allows a mop bucket to be used on a relatively flat surface and allows a user to traverse one or more stairs with a mop bucket containing fluid by maintaining the bucket in a level position as the mop bucket cart is inclined to traverse one or more stairs.

4 Claims, 6 Drawing Sheets

SELF LEVELING MOP BUCKET CART

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to mop buckets and carts for mop buckets, and more specifically to mop bucket carts that can traverse stairs while maintaining the mop bucket in a level position.

2. General Background of the Invention

Known mop buckets and mop bucket carts are frequently equipped with wheels or casters that allow them to traverse ground that is generally flat. But many locations in which mopping is required comprise more than one relatively flat level that are interconnected by stairs. In such locations, the person using a standard mop bucket or mop bucket cart is forced to choose between the equally unpleasant options of (1) lifting the mop bucket or mop bucket cart containing eight or more gallons of water and carrying it up or down the stairs or (2) emptying the mop bucket on the current level and refilling it on the second level.

The first option is unpleasant because the weight of eight gallons of water alone is more than 64 pounds. Trying to maneuver such a large, unstable weight up or down stairs could easily result in a significant injury if the person carrying the mop bucket were to trip. Moreover, having to lift and carry such a weight on a frequent basis could result in lower back or other physical problems.

The second option is equally unpleasant for at least three reasons. First, this option increases the consumption of materials because the cleaning solution in the mop bucket will frequently be discarded before it needs to be. Second, this option requires redundant infrastructure to be in place on each level—namely facilities to empty and refill the mop bucket on each level. Finally, this option will result in a loss in productivity since the employee will spend more time emptying and refilling the mop bucket.

The present invention resolves this problem by allowing the employee to traverse stairs with a filled mop bucket without having to lift and carry the mop bucket. Thus, the employee is not forced to choose between the unpleasant alternatives discussed above.

SUMMARY OF THE INVENTION

The present invention relates to a mop bucket cart comprising a body, said body having a first side, a second side opposing said first side, a first end interconnecting a first end portion of the first side to a first end portion of the second side, and a second end interconnecting a second end portion of the first side to a second end portion of the second side; a bucket carriage, said bucket carriage being pivotally connected to opposing first and second side of said body; and at least one pivoting support member, said at least one pivoting support member being pivotally connected to the body; whereby said at least one pivoting support member prevents said bucket carriage from pivoting when said mop bucket cart is on a flat surface and allows said bucket carriage to pivot when said mop bucket cart is tilted toward one of the ends of the body.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
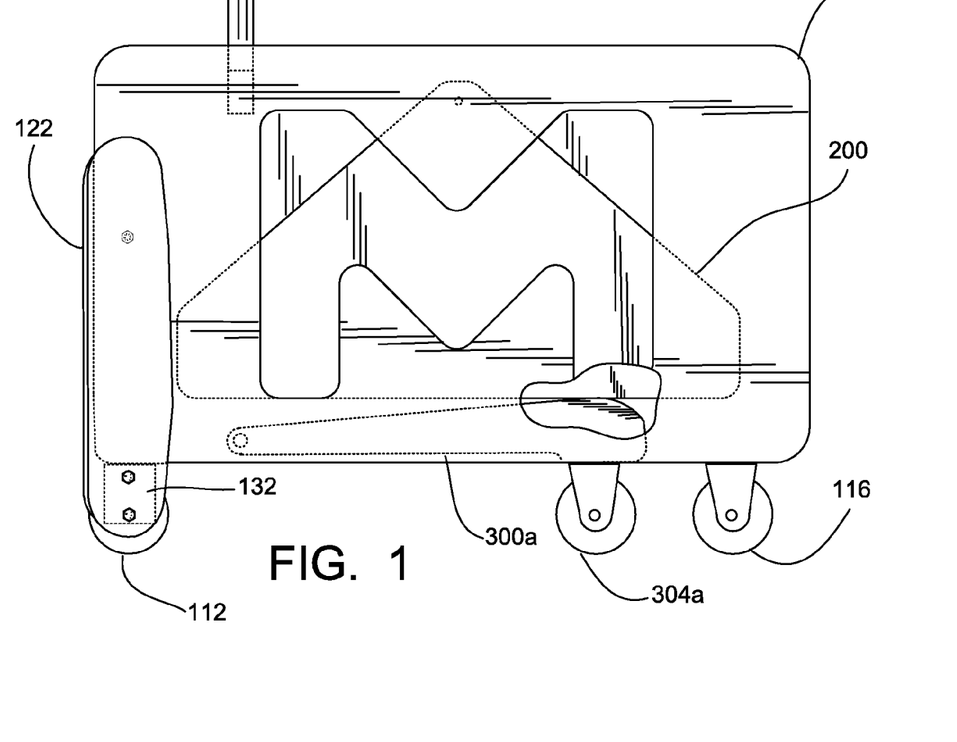
FIG. 1 is a side view of an embodiment of the present invention.
Figure 1A:
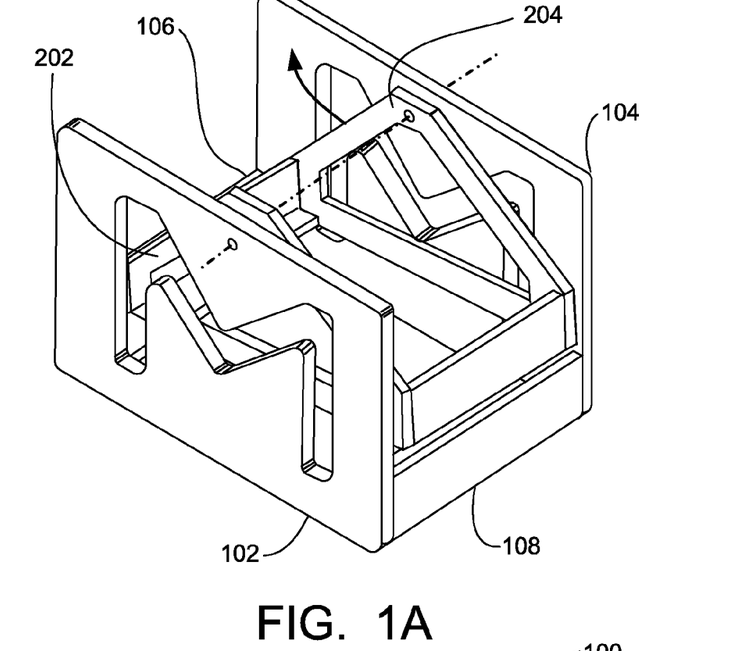
FIG. 1A is a perspective view of the bucket carriage and body of the embodiment illustrated in FIG. 1.

FIG. 1 illustrates an embodiment of the self-leveling mop-bucket cart 1. Mop bucket cart 1 includes handle 20, body 100, bucket carriage 200, and pivoting support members 300. As used herein, the term caster includes both wheels and casters. In the illustrated embodiment, body 100 comprises first side 102 and opposing second side 104 that are interconnected by first cross-member 106 and second cross-member 108 (best seen in FIG. 1A). In the illustrated embodiment, each of opposing sides 102 and 104 has defined therethrough an M-shaped opening. This opening is to facilitate the molding of the sides out of a thermoplastic material such as polypropylene; neither the opening nor the particular shape of the opening is necessary for the functioning of mop bucket cart 1. Alternatively, sides 102 and 104 could form an upside down T-shape, with the end portions of the arms of the T being interconnected by cross-members 106 and 108. In yet another alternative, sides 102 and 104 could be solid. U-shaped handle 20 extends upward from sides 102 and 104 of body 100.

Figure 2:
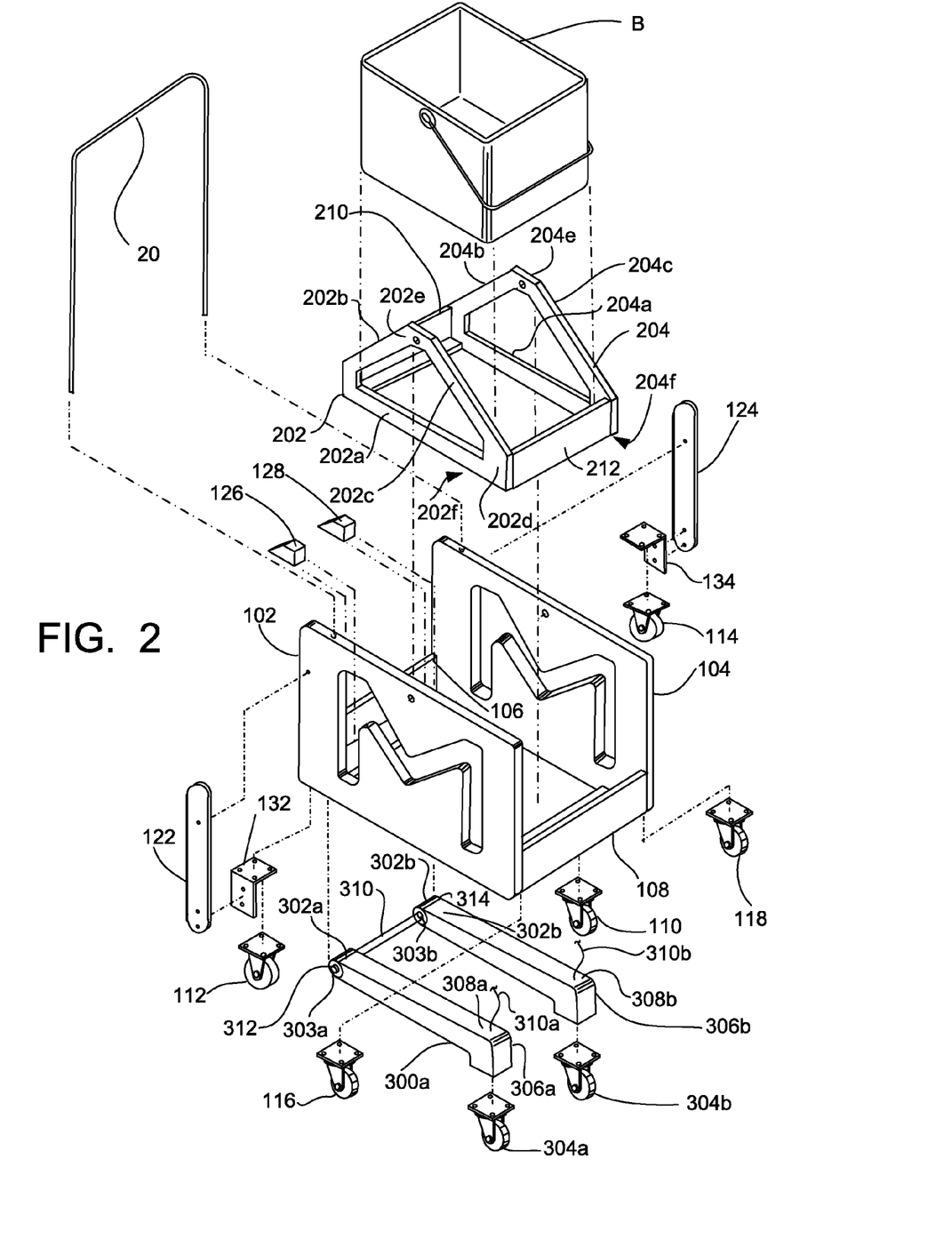
FIG. 2 is an exploded perspective view of the embodiment illustrated in FIG. 1.

As illustrated in FIG. 2, casters 110, 112, 114, 116, and 118 are affixed to the bottom portion of body 100. Casters 112 and 114 are located toward the first end of body 100 and serve as the pivot point relative to the relatively flat surface on which mop bucket cart 1 travels to allow mop bucket cart 1 to traverse stairs. Casters 110, 116, and 118 are located under the opposing end of said body. Caster 110 is centrally located to provide resistance to tipping when a mop wringer (not shown) is installed on the side of bucket B opposite the location of handle 20. While in the illustrated embodiment casters 112 and 114 are of the fixed type and casters 110, 116, and 118 are of the swivel type, any of the casters could be either fixed or pivoting.

Still referring now to FIG. 2, brackets 132 and 134 are located between caster 112 and 114 respectively. Stair climber mechanism 122 is attached to side 102 and bracket 132 and stair climber mechanism 124 is attached to side 104 and bracket 134. Stair climber mechanisms 122 and 124 are aligned with casters 112 and 114 respectively to provide for a smooth transition from stair climber mechanisms 122 and 124 to casters 112 and 114 as mop bucket cart 1 traverses each stair (best seen in FIG. 4). Stair climber mechanisms 122 and 124 can be any type of standard stair climber mechanism for dollies such as model number 95991 that is available from Clamor, Inc.

Figure 5:
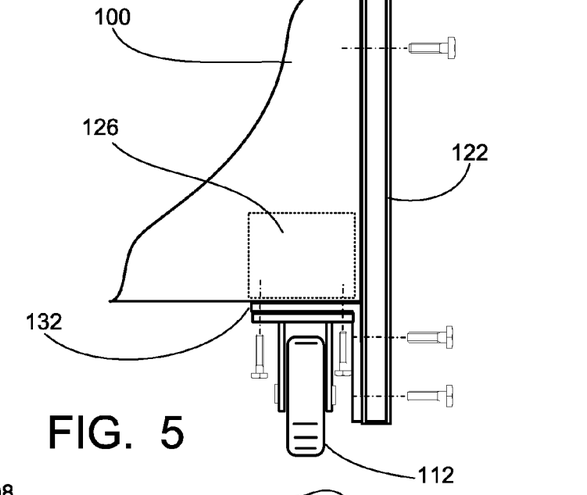
FIG. 5 is a partial frontal view of the embodiment illustrated in FIG. 1.
Figure 6:
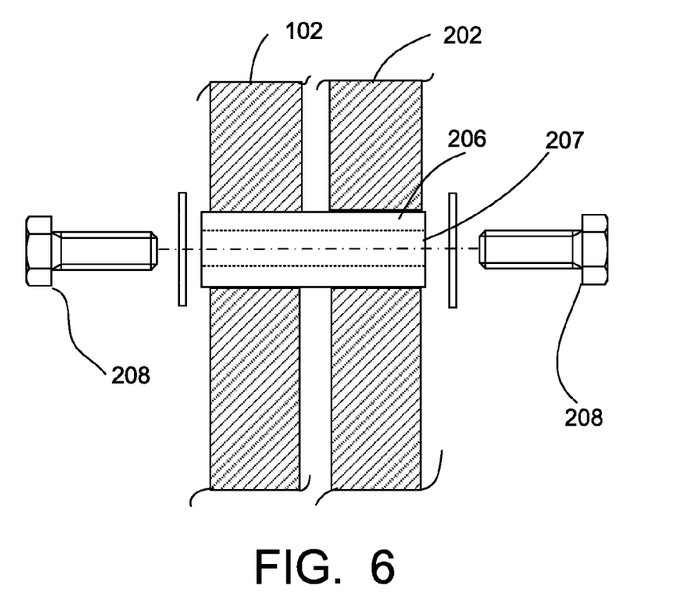
FIG. 6 is a sectional view of the pivotal connection between the body and the bucket carriage of the embodiment illustrated in FIG. 1.

Still referring to FIG. 2, bucket carriage 200 comprises a pair of sides 202 and 204. The upper vertex of sides 202 and 204 is pivotally connected to sides 102 and 104 respectively. In the illustrated embodiment, this pivotal connection is accomplished using pins 206 that have threaded passage 207 therethrough and bolts 208 that thread into each end of pins 206 (best seen in FIG. 6). Of course, this connection could be accomplished in alternative manners—one such example being a solid pin that is retained in place using cotter pins on each end. Still referring to FIG. 2, reverse stop blocks 126 and 128 prevent bucket carriage 200 from pivoting away from handle 20. These reverse stop blocks are connected to cross-member 106 as best seen in FIG. 5.

Referring again to FIG. 2, the features of bucket carriage 200 can be observed. Since the sides 202 and 204 are identical, only side 202 will be described in detail using a letter appended to 202 to identify the various portions of side 202. In the illustrated embodiment, side 202 is unitary and formed from polypropylene. Alternatively, side 202 could be formed of two or more separate pieces that are joined together and could be made from other materials. Members 202b and 202c extend from opposing ends of base 202a, forming the lower vertices of the triangle 202d, and intersect at the upper vertex of the triangle 202e.

The corresponding lower vertices 202d and 204d of sides 202 and 204 are interconnected by L-shaped cross-members 210 and 212. The bottom portion of the L shape of cross-members 210 and 212 projects inward toward the center to mop bucket cart 1. The upper surfaces of the bottom portions of the L shape of cross-members 210 and 212 are of sufficient length and spaced sufficiently apart to receive a standard ten gallon mop bucket (shown in FIG. 2 as bucket B). To accommodate larger or smaller mop buckets, the length and spacing of cross-members 210 and 212 can be increased or decreased to the dimensions necessary to accommodate alternate buckets, or a removable shelf (not shown) can be placed onto cross-members 210 and 212 to provide a solid surface to support a smaller mop bucket.

Figure 3:
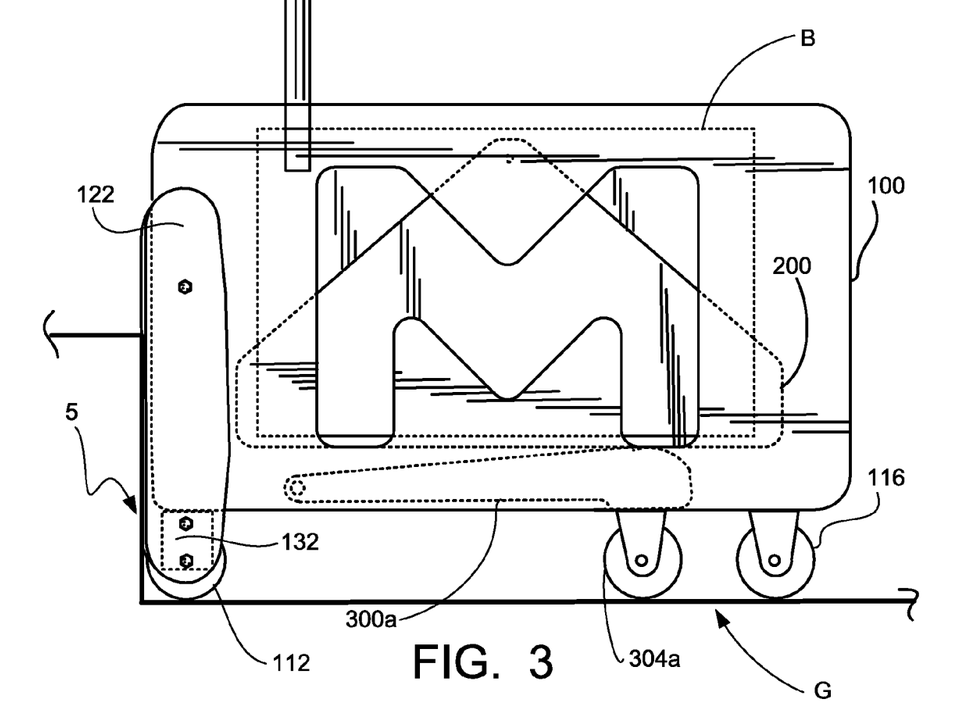
FIG. 3 is a side view of the embodiment illustrated in FIG. 1.

Still referring to FIG. 2, pivoting support members 300a and 300b are shown. Since pivoting support members 300a and 300b are identical, only pivoting support member 300a will be described in detail. Pivoting support member 300a pivots about rod 310. First end 312 of rod 310 is connected to side 102 and second end 314 is connected to side 104. First end portion 302a of pivoting support member 300a defines a hole 303a through which rod 310 passes. Caster 304, which is illustrated as a pivoting type caster but could also be a fixed type caster, is located toward second end portion 306a of pivoting support member 300a such that when mop bucket cart 1 is on a flat surface, such as ground G in FIGS. 3 and 4, the upper side 308a of the second end portion 306a of pivoting arm engages bottom surface 202f of side 202 of bucket carriage 200. Pivoting support member 300b functions in a similar manner with upper side 308b of the second end portion 306b of pivoting support member 300b engaging bottom surface 204f of side 204 of bucket carriage 200 when mop bucket cart 1 is on a flat surface such as ground G in FIGS. 3 and 4.

Figure 4:
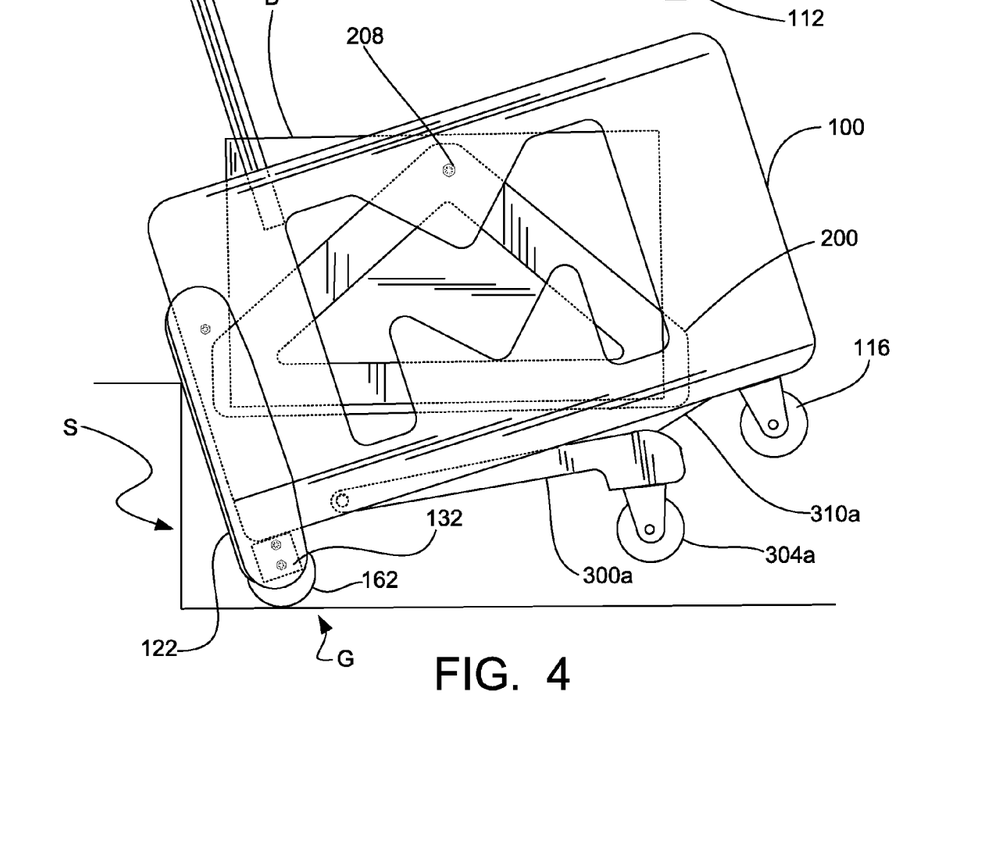
FIG. 4 is a side view of the embodiment in FIG. 1 inclined to climb a stair.

Referring now to FIG. 4, mop bucket cart 1 can traverse stairs S by pivoting mop bucket cart 1 on casters 112 and 114 until stair climber 120 engages the lip of step S. As mop bucket cart 1 is pivoted about casters 112 and 114, pivoting support members 300a and 300b pivot relative to mop bucket cart 1 allowing bucket carriage 200 to pivot and maintain bucket 10 in a level position. The angle through which pivoting support members 300a and 300b is allowed to pivot is however arrested by cords 310a and 310b. The length of cords 310a and 310b is sufficient to allow pivoting support member 300 to rotate far enough to allow bucket carriage 200 to pivot freely but short enough to prevent pivoting support members 300a and 300b from contacting stair S as mop bucket cart 1 climbs stair S.

As mop bucket cart 1 is rotated to an upright position on flat ground after traversing stair S, bucket carriage 200 pivots with respect to mop bucket cart 1 to maintain bucket B in an upright position. As mop bucket cart 1 is rotated into its upright position, casters 304a and 304b on pivoting support members 300a and 300b respectively reengage with ground G. Once casters 108 and 116 are again in contact with flat ground G, upper side 308a of pivoting support member 300a again engages bottom surface 202f of side 202 of bucket carriage 200 and upper side 308b of pivoting support member 300b again engages bottom surface 204f of side 204 of bucket carriage 200 such that pivoting support members 300a and 300b again prevents bucket carriage 200 from pivoting. And in the illustrated embodiment, reversed stop blocks 126 and 128 prevent bucket carriage 200 from pivoting away from handle 20.

While the use of two pivoting support members 300a and 300b is illustrated, mop bucket cart 1 could alternatively utilize only a single pivoting support member. Similarly, mop bucket cart 1 could utilize a single reverse stop block rather than the two that are illustrated.

Figure 7:
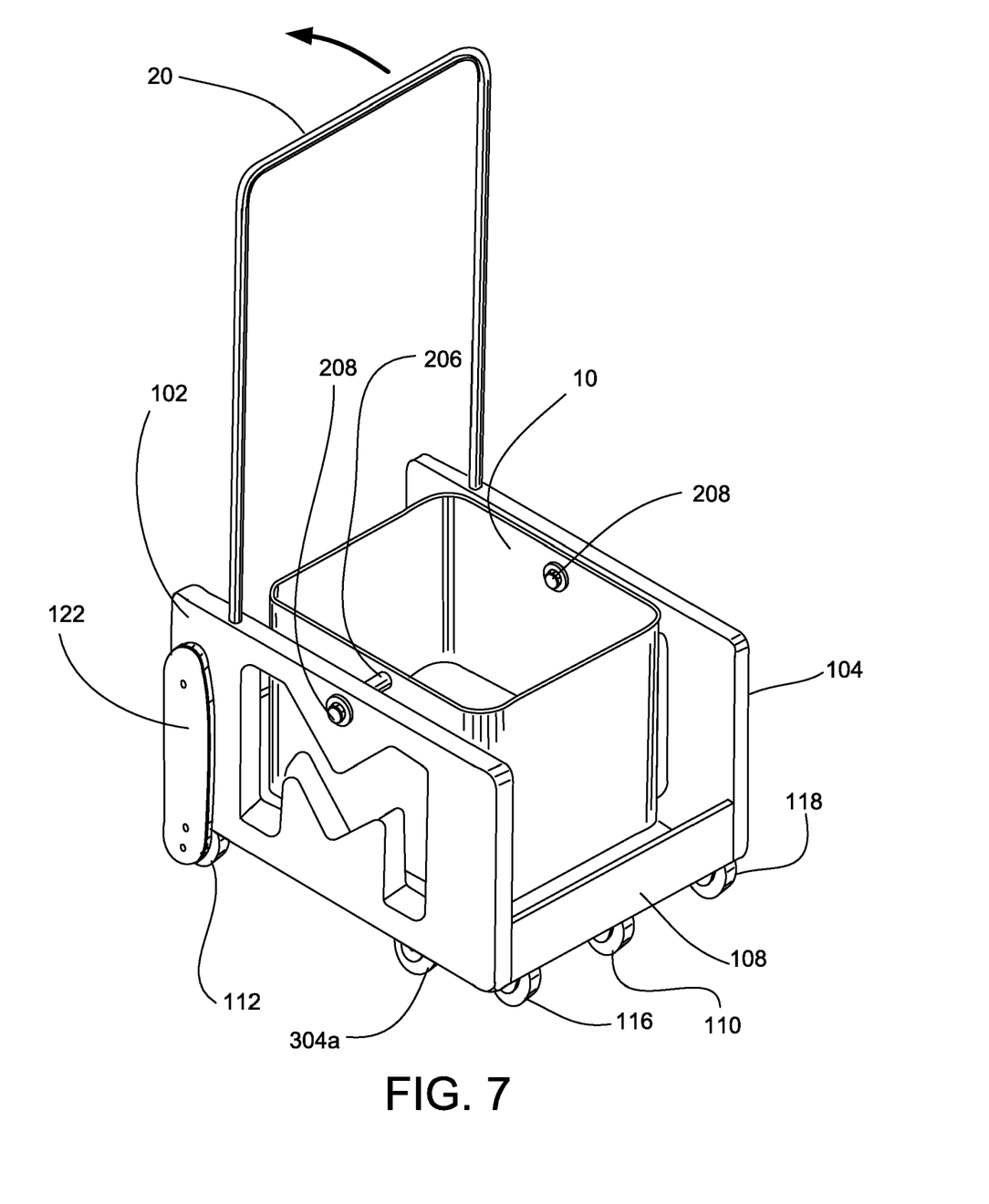
FIG. 7 is a perspective view of an alternative embodiment of the invention.
Figure 8:
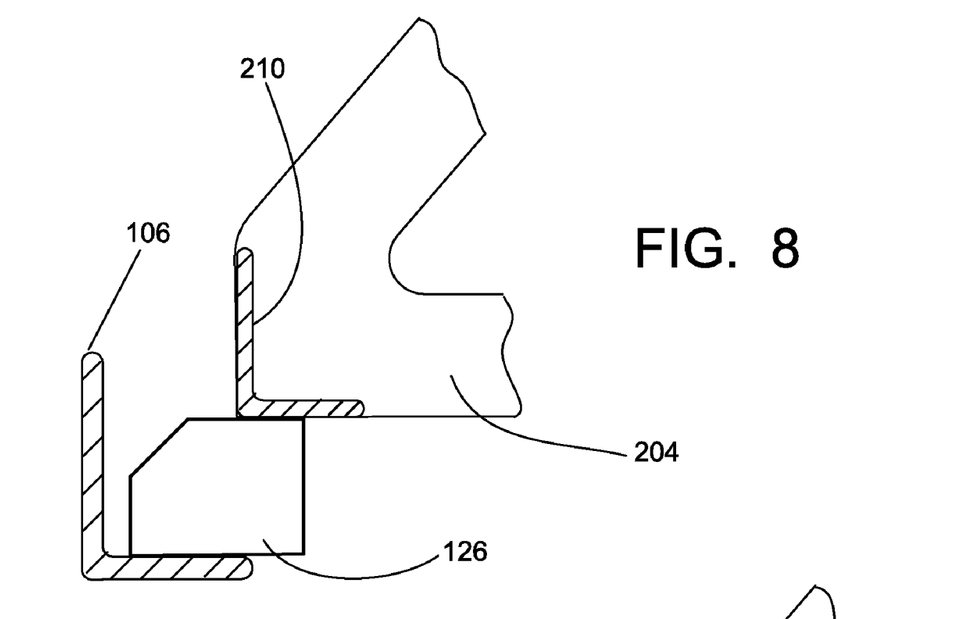
FIG. 8 is a partial, sectional side view of the embodiment illustrated in FIG. 1.
Figure 9:
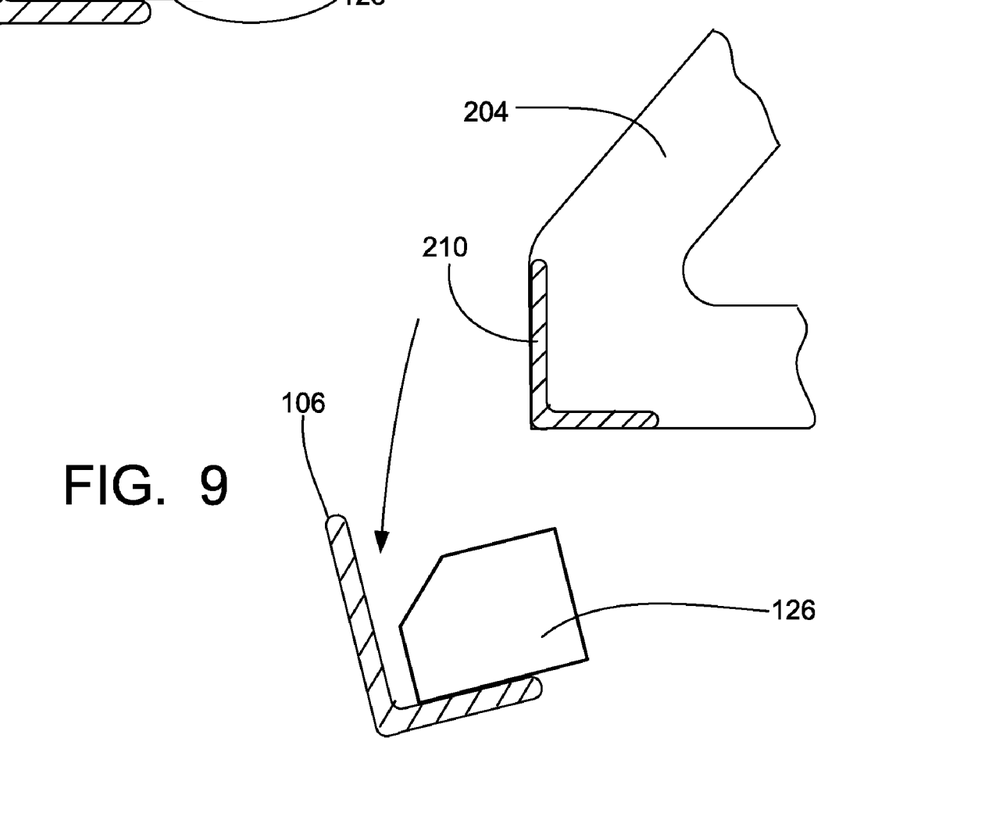
FIG. 9 is a partial, sectional side view of the embodiment illustrated in FIG. 1.

In the alternative embodiment illustrated in FIG. 7, mop bucket 10 is pivotally connected directly to sides 102 and 104 of mop bucket cart 1. In this embodiment, pivoting support members 300a and 300b engage bucket B directly to prevent it from pivoting when mop bucket cart 1 is on flat ground and pivot out of the way when mop bucket cart 1 is inclined toward handle 20 to traverse one of more stairs. Reverse stop blocks 126 and 128 may also be utilized as described above to prevent bucket B from pivoting away from handle 20.

While the above describes the illustrated embodiment, those skilled in the art may appreciate that certain modifications may be made to the apparatus and methodology herein disclosed, without departing from the scope and spirit of the invention. Thus, it should be understood that the invention may be adapted to numerous rearrangements, modifications, and alterations and that all such are intended to be within the scope of the appended claims.

We claim:

1. A mop bucket cart comprising:
   a body, said body defining a central opening surrounded by a pair of opposing ends and a pair of opposing sides that are connected transversely to the end portions of said pair of opposing sides wherein each of said opposing sides has a height greater than the height of either of said pair of opposing ends and said body being supported by a plurality of casters;

a bucket carriage, said bucket carriage being pivotally attached to the pair of opposing sides and said bucket carriage being adapted to receive a mop bucket;

means for allowing said mop bucket cart to traverse one or more stairs while holding a mop bucket containing liquid wherein said means for allowing comprises a rod, said rod extending from a first side of the pair of opposing sides of the body to a second side of the pair of opposing sides of the body and being located near the bottom of the sides and adjacent to a first end of the pair of opposing ends of the body; and at least one pivoting support member, said at least one pivoting support member being pivotally connected to the rod;

whereby said at least one pivoting support member prevents said bucket carriage from pivoting when said mop bucket cart is on a flat surface and allows said bucket carriage to pivot when the mop bucket cart is tilted toward one of the ends of the body and said means for allowing permits said bucket carriage to pivot and maintain the mop bucket in a level position when the mop bucket cart is inclined to traverse the stairs and wherein said means for allowing prevents the bucket carriage from pivoting when the mop bucket cart is on substantially flat ground.

2. The mop bucket cart of claim 1 wherein said at least one pivoting support member includes a first end portion, said first end portion defining a hole sized to receive said rod about which said pivoting support member rotates and a second end portion having a caster attached to the underneath portion of said second end portion and having an upper surface opposite said caster whereby when said caster on said pivoting support member is engaged with flat ground simultaneously with the casters connected to the body the upper surface of said pivoting support member engages the bucket carriage and prevents the bucket carriage from rotating and whereby said pivoting support member rotates away from the bucket carriage when the mop bucket cart is rotated about the pivot casters connected to the body allowing the bucket carriage to rotate freely.

3. A mop bucket cart capable of maintaining a mop bucket in a level orientation on a bucket carriage as the mop bucket cart traverses one or more stairs comprising:

a body, said body having a rectangular frame defining a central opening and having a first pair of opposing sides that form the first and second sides of the body respectively and a second pair of opposing sides that form the first and second ends of the body respectively wherein each of the first pair of opposing sides have a first height and each of the second pair of opposing sides have a second height and the first height is greater than the second height by at least the height of the bucket carriage;

a first pivot caster connected to a bottom side of the frame at a corner portion of said frame defined by the first side of the body and the first end of the body;

a second pivot caster connected to the bottom side of the frame at a corner portion of said frame defined by the second side of the body and the first end of the body;

a first support caster connected to the bottom side of the frame at a corner portion of said frame defined by the first side of the body and the second end of the body;

a second support caster connected to the bottom side of the frame at a corner portion of said frame defined by the second side of the body and the second end of the body;

a third support caster connected to the bottom side of the frame at a point on the second end of the body intermediate the location of the first support caster and the second support caster;

a rod, said rod extending from the first side of the body to the second side of the body and being located near the bottom of the sides and adjacent to the first side of the body; and a U-shaped handle with the open ends of the U being connected to the first side of body and the second side of the body proximal to the first end of the body;

the bucket carriage, said bucket carriage being pivotally attached to the first and second sides of the body and said bucket carriage having a pair of opposing triangular sides interconnected the at their lower vertices by a pair of cross-members with each of said triangular sides being adjacent to one of the sides of the body wherein each of the cross-members has an L-shaped cross-section with the base of the L extending toward the other cross-member;

a pair of pivoting support members, each said pivoting support member having a first end portion, said first end portion defining a hole sized to receive the rod about which said pivoting support member rotates;

a second end portion having a caster attached to the underneath portion of said second end portion and having an upper surface opposite said caster whereby when the caster on said pivoting support member is engaged with flat ground simultaneously with the casters connected to the body the upper surface of said pivoting support member engages the bucket carriage and prevents the bucket carriage from rotating and whereby said pivoting support member rotates away from the bucket carriage when the mop bucket cart is rotated about the pivot casters connected to the body allowing the bucket carriage to rotate freely; and a stair climbing mechanism attached to each side of the body, each said stair climbing mechanism being aligned with the adjacent pivot caster to effect a smooth transition from said stair climbing mechanism to the adjacent pivot caster as the mop bucket cart traverses a stair.

4. The mop bucket cart of claim 3 further comprising a pair of reverse stop blocks, said reverse stop blocks being interconnected to the body at opposing ends of the first side of the body whereby said reverse stop blocks prevent the bucket carriage from pivoting away from the handle.

* * * * *

UNITED STATES PATENT AND TRADEMARK OFFICE
CERTIFICATE OF CORRECTION

| | | |
|---|---|---|
| PATENT NO. | : 7,878,514 B1 | Page 1 of 1 |
| APPLICATION NO. | : 11/744580 | |
| DATED | : February 1, 2011 | |
| INVENTOR(S) | : John Hopkins and Thomas Cunningham | |

It is certified that error appears in the above-identified patent and that said Letters Patent is hereby corrected as shown below:

In Column 6, line 25
replace "interconnected the at their"
with "interconnected at their"

Signed and Sealed this
Eighth Day of March, 2011

David J. Kappos
*Director of the United States Patent and Trademark Office*